United States Patent
Bretschger (10) Patent No.: US 9,505,636 B2
(45) Date of Patent: Nov. 29, 2016

(54) MODULAR ENERGY RECOVERING WATER TREATMENT DEVICES

(75) Inventor: Orianna Bretschger, San Diego, CA (US)

(73) Assignee: J. Craig Venter Institute, Rockville, MD (US)

(*) Notice: Subject to any disclaimer, the term of this patent is extended or adjusted under 35 U.S.C. 154(b) by 455 days.

(21) Appl. No.: 13/521,884

(22) PCT Filed: Jan. 14, 2011

(86) PCT No.: PCT/US2011/021338
§ 371 (c)(1),
(2), (4) Date: Feb. 7, 2013

(87) PCT Pub. No.: WO2011/088348
PCT Pub. Date: Jul. 21, 2011

(65) Prior Publication Data
US 2013/0137000 A1    May 30, 2013

Related U.S. Application Data (60) Provisional application No. 61/294,841, filed on Jan. 14, 2010.

(51) Int. Cl.
*H01M 8/16* (2006.01)
*H01M 8/02* (2006.01)
*C02F 1/467* (2006.01)
(Continued)

(52) U.S. Cl.
CPC .......... *C02F 1/4676* (2013.01); *C02F 1/4672* (2013.01); *C02F 3/005* (2013.01); *C02F 3/301* (2013.01); *H01M 8/08* (2013.01); *H01M 8/16* (2013.01); *C02F 2201/007* (2013.01); *C02F 2209/001* (2013.01); *C02F 2209/003* (2013.01); *C02F 2209/02* (2013.01); *C02F 2209/06* (2013.01); *C02F 2209/22* (2013.01); *H01M 16/006* (2013.01); *H01M 2300/0002* (2013.01); *Y02E 50/343* (2013.01); *Y02E 60/527* (2013.01)

(58) Field of Classification Search
CPC ...... H01M 8/16; H01M 8/002; H01M 8/004; H01M 8/0202; H01M 8/06; H01M 8/02
See application file for complete search history.

(56) References Cited

U.S. PATENT DOCUMENTS

2004/0101741 A1*  5/2004  Minteer et al. ............... 429/43
2005/0208343 A1*  9/2005  Kim ...................... H01M 4/86
                                                            429/2

(Continued)

FOREIGN PATENT DOCUMENTS

CN    200780025190.0     7/2009
JP    2004-342412 A      2/2004

(Continued)

OTHER PUBLICATIONS

"Cathode Performance as a Factor in Electricity Generation in Microbial Fuel Cells", Oh et al., Environmental Science Technology, 38, p. 4900-4904, 2004.*

(Continued)

*Primary Examiner* — Kenneth Douyette
(74) *Attorney, Agent, or Firm* — Foley Hoag LLP (57) ABSTRACT

A modular device that is optimized for preliminary water treatment and energy generation and methods for operating the same are described.

17 Claims, 6 Drawing Sheets

(51) Int. Cl.
 C02F 3/00 (2006.01)
 C02F 3/30 (2006.01)
 H01M 8/08 (2016.01)
 H01M 16/00 (2006.01)

(56) References Cited

U.S. PATENT DOCUMENTS

| | | |
|---|---|---|
| 2007/0259217 A1 | 11/2007 | Logan |
| 2008/0213632 A1 | 9/2008 | Noguera et al. |
| 2008/0286624 A1 | 11/2008 | Lovley et al. |
| 2008/0292912 A1* | 11/2008 | Logan et al. ............ 429/2 |
| 2009/0029198 A1 | 1/2009 | Jin et al. |
| 2009/0142627 A1* | 6/2009 | Shimomura et al. ........ 429/2 |
| 2009/0305085 A1 | 12/2009 | Crookes et al. |
| 2010/0003543 A1 | 1/2010 | Zhou |

FOREIGN PATENT DOCUMENTS

| | | |
|---|---|---|
| JP | 2004-342412 | 12/2004 |
| JP | 2005-535095 A | 11/2005 |
| JP | 2007-505442 A | 3/2007 |
| JP | 2008288198 A | 11/2008 |
| JP | 2009-093861 A | 4/2009 |
| JP | 2009-158426 A | 7/2009 |
| WO | WO-2007131022 A2 | 11/2007 |

OTHER PUBLICATIONS

"Scaling up Microbial Fuel Cells", Dewan et al., Environmental Science Technology, 42, p. 7643-7648, 2008.*

"Harnessing the Power of Poop", Karen Miller, May 19, 2004. Retrieved online on Mar. 6, 2010 from http://www.space.com/businesstechnology/astronaut_electricity_040519.html.*

Aelterman, et al. "The anode potential regulates bacterial activity in microbial fuel cells," Appl. Microbiol Biotechnology, 78 (3): 409-418 (Jan. 10, 2008).

Rabaey, Korneel, et al. "Cathodic oxygen reduction catalyzed by bacteria in microbial fuel cells," The ISME Journal, 2: 519-527 (2008).

You, Shijie, et al. "A graphite-granule membrane-less tubular air-cathode microbial fuel cell for power generation under continuously operational conditions," Journal of Power Sources; 173(1): 172-177 (Oct. 3, 2007).

Extended EP Search Report for EP Application No. 11733457.3 mailed Sep. 11, 2013.

Office Action from corresponding Chinese Application No. 201180014050.X Dated Sep. 2, 2014.

Office Action from corresponding Japanese Application No. 2012-549123 Dated Dec. 2, 2014.

Cha, et al. "Directly applicable microbial fuel cells in aeration tank for wastewater treatment," Bioelectrochemistry, 78(1): 72-79 (Jul. 2009).

Fan, Y. et al., "Quantification of the Internal Resistance Distribution of Microbial Fuel Cells," Environ. Sci. Technol., US, American Chemical Society, Sep. 24, 2008, 42 (21), pp. 8101-8107.

International Search Report for PCT/US2011/021338 completed on Oct. 10, 2011.

Virdis, B. et al., "Electron Fluxes in a Microbial Fuel Cell Performig Carbon and Nitrogen Removal," Environmental Science and Technology, U.S.A., American Chemcal Society, 43(13):5144-5149 (2009).

* cited by examiner

Influent                    15 day Effluent

MODULAR ENERGY RECOVERING WATER TREATMENT DEVICES

RELATED APPLICATIONS

This application is a 371 national stage application of PCT/US11/021338, filed Jan. 14, 2011, which claims the benefit of priority to U.S. Provisional Patent Application Ser. No. 61/294,841, filed Jan. 14, 2010; which is hereby incorporated by reference in its entirety.

BACKGROUND

Sludge is a mixture of dense material that is collected from raw sewage during primary treatment, and secondary biomass that rapidly grows during the secondary and tertiary treatment steps in a conventional wastewater treatment plant. According to regulations set by the U.S. Environmental Protection Agency (EPA), the sludge produced by any single wastewater plant must be subjected to a treatment strategy that will result in a 38% reduction of the total volatile suspended solids (VSS) and a final concentration of fecal coliform that is less than $2 \times 10^6$ colony forming units. After meeting these standards, the treated sludge is considered Class B biosolids and may be disposed of in a landfill, or land applied to a restricted site as defined by 40 CFR Part 503 of the Clean Water Act.

Sludge treatment strategies often exploit the activity of microorganisms to remove organic contaminants from waste streams. Strategies include aerobic and anaerobic methods for wastewater and sludge treatment. However, such conventional strategies suffer from numerous disadvantages. Aerobic methods, for example, require a significant amount of energy input to mix and to aerate reactor contents. Such sludge treatment methods also result in large volumes of secondary biomass that must be treated, leading to extra energy cost for treatment and for disposal.

Anaerobic sludge digestion processes enable a limited amount of energy recovery through, for example, methanogenesis and co-generation. However, energy production through such processes is inefficient and excess methane often must be burned as a waste gas. Anaerobic digesters also require a long residence time and multiple reactors must be employed to treat the large sludge volumes produced in cities. As a result, such digesters require much higher levels of energy than they are able to produce, as well as a large land area for operation. Anaerobic sludge digestion also produces a large amount of secondary biomass and recalcitrant solid waste products, requiring additional treatment and disposal cost.

Microbial fuel cells (MFCs) offer the potential to employ microorganisms to convert the energy stored in organic carbon compounds (waste) into electricity. The flow of electrons through the MFC system results in accelerated primary sludge reduction, reduced volumes of secondary sludge and direct electrical power generation. The catalytic activity of an MFC is generated by microbes, generally, bacteria, that attach to the conductive surfaces of electrodes and form electrochemically active biofilms. Microbes within the biofilm at the anode enzymatically extract electrons from organic components in the sludge, wastewater or other liquid input and transfer the electrons to the electrode. The microbes must perform the electron transfer to the electrode surface to maintain biological functions, in other words, the microbes "breathe" the electrode surface to live. Because MFC systems are designed to immediately move the electrical energy away from the microbes through electrical current generation, the microbes are unable to use the energy for growing and for building biomass. Furthermore, the movement of energy away from the microbes also accelerates microbial metabolism and increases primary sludge reduction rates.

Completion of the reactions in existing MFC devices takes place in physically separate, but electrically linked, compartments with different bacterial biofilms. The cathode is used as a source of energy during the reduction of oxygen or other oxidant, such as a nitrite, a sulfate or a heavy metal. The cathode is submerged in a liquid and therefore bacterial growth on the cathode is limited by the energy source being delivered across the circuit and therefore, biomass production is reduced, relative to traditional aerobic treatment systems. Additionally, the production of new water results from the biologically catalyzed oxygen reduction reaction with the cathode. For example, one new molecule of water can be produced for every four electrons and two protons that cross from the anode compartment to the cathode compartment during MFC operation, for example, when oxygen is the oxidant. The production of water is biologically catalyzed and can be optimized based on how the MFC system is operated.

The products of an MFC system include: 1) treated non-potable water (to secondary levels) or potable water and carbon dioxide from the anode; 2) a new source of water evolving from the cathode, for example, when oxygen is included as an oxidant; and 3) electricity as a result of the bioelectrochemical reactions in both compartments.

Research has shown that MFC systems operating with sludge as a fuel source are able to degrade between 40% to 80% of the initial organic content within twelve hours of residence time (Logan, B. E. (2005) *Waste Science and Technology* 152:31-37; Scott, K. and C. Murano (2007) *Journal of Chemical Technology & Biotechnology* 82: 92-100; Mohan, S. V. et. al., (2008) *Biosensors and Bioelectronics* 23: 1326-1332). However, the work was conducted in laboratories, using reactors holding 30 to 500 milliliters of wastewater.

MFC based systems that can effectively treat wastewater on an industrial scale are needed.

SUMMARY OF THE INVENTION

Featured herein are modular systems comprised of a plurality of microbial fuel cells (MFCs) for processing large volumes of wastewater. MFCs within the system may be arranged in series or in parallel and particular MFCs may be optimized for a particular purpose (e.g. to degrade a particular component of the influent, to accommodate a particular volume, etc). For example, the anode of one or more of the MFCs can contain a biofilm that has been enriched for organisms that breakdown a specific organic material, transfer electrons and/or exist in an anaerobic environment. The cathode of one or more of the MFCs can contain a biofilm that has been enriched to exist in an aerobic environment and/or reduce an oxidant.

The anode of the MFC can be positioned internal to the cathode, so as to allow an anaerobic environment to occur in the anode compartment and an aerobic environment to occur in the cathode compartment. In certain embodiments, the cathode has a larger surface area than the anode. In further embodiments, the distance between the anode and cathode is less than about 2 cm.

Also featured are methods for making biofilms that are enriched for particular organisms. Certain methods use only wastewater sources and do not require the addition of selective carbon sources.

Further featured are methods for enhancing the treatment of wastewater in an MFC containing system comprising the steps of: (a) monitoring the electrical current generated from the reactor; and (b) adding fresh influent to the system when decreasing electrical current is observed.

The systems described herein produce a treated non-potable water (that is, partially purified) or a potable water and carbon dioxide from the anode; new water from the cathode; and electricity as a result of the bioelectrochemical reactions in both compartments. The decrease in biomass production and the direct generation of electricity reduces the overall cost (relative to maintaining anaerobic or aerobic digesters), while accomplishing comparable or better organic oxidation rates and efficient energy recovery. The systems also reduce production of the waste gas methane, a significant greenhouse gas, by moving energy away from the microbes as electricity and defining the environment where extracellular respiration is energetically more favorable than reduction of carbon dioxide to methane. Carbon dioxide produced from the systems can be harnessed, for example, as fuel for photosynthetic ponds, which can be used, for example, as biomass for fertilizer or to produce biofuels. In addition, the systems provide versatility with respect to the wastewater processed and energy consumed. For example, the system may be optimized for sludge reduction at low peak demand (e.g., 64 mg $L^{-1}$ $day^{-1}$) and electricity production at high peak demand (e.g., 1 $kW/m^3$).

Other features and advantages will become apparent from the following detailed description and claims.

DETAILED DESCRIPTION

Figure 1:
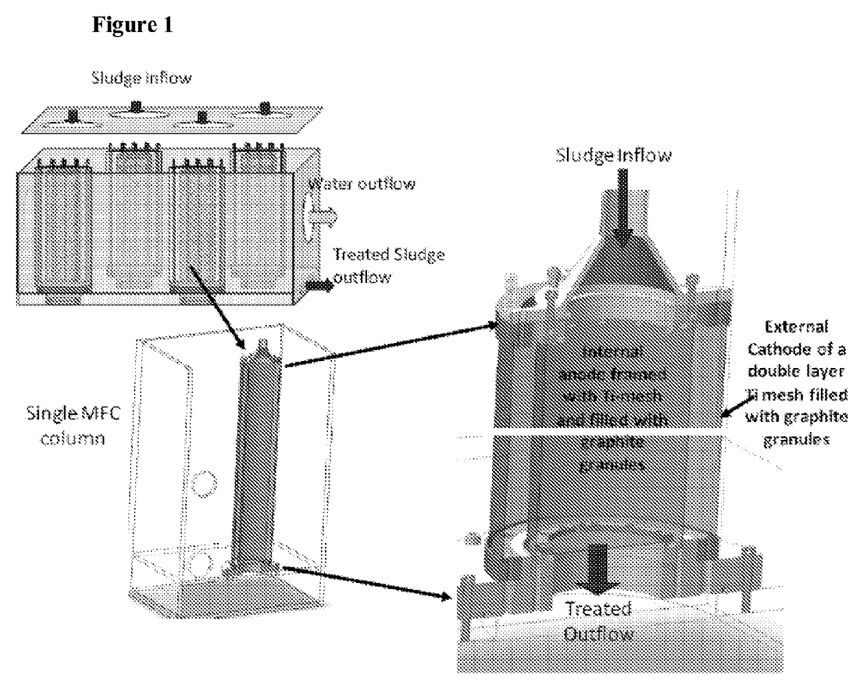
FIG. 1 shows an exemplary modular wastewater treatment system.

An exemplary embodiment of the modular MFC system described herein is depicted in FIG. 1. Each column represents one MFC module and all the columns can be operated in parallel for sludge degradation.

Primary sludge flows in through the sludge inflow means at the top of the MFC and exits through a treated outflow means at the bottom of the column. In certain embodiments the function of the inflow means and the outflow means are capable of being reversed to remove and/or prevent clogging. The column contains an internal anode and external cathode. The anode is comprised of graphite granules framed with titanium mesh. The cathode is a double layer of titanium mesh filled with graphite granules. Minimum spacing between the anode and cathode (≤1 cm) is utilized, to facilitate optimal mass transfer. The outer layer of the anode is wrapped in a nylon mesh (about 30 µm pore diameter). The system is submerged in water or another liquid effluent (e.g., primary or secondary clarifier effluent) to minimize the growing of secondary biomass at the cathode surface.

The influent to be treated can come from any source, including, for example, any water-based composition treated in the MFC to produce a potable water, a graywater or other form of near-potable water. Examples of influent include sludge; a wastewater; a runoff; an industrial wastewater, such as the byproducts of paper making or milling; a food industry wastewater, such as a brewery wastewater; an agricultural wastewater; a residential wastewater; a municipal wastewater; an animal or agricultural wastewater; a sewage; a water from a body of water; and an effluent of anaerobic digesters.

"Treatment" refers to a breakdown of organic matter in wastewater. Effective treatment may be demonstrated as a reduction in: a) total suspended solids (e.g. from 22000 mg/L to 6600 mg/L in a 10 day period); (b) biological oxygen demand (e.g. from 4500 mg/L to 2250 mg/L in a 5 day residence time); (c) methanogenesis (e.g. from 1.4 ppm to 0.7 ppm over a 10 day period); and (d) odor (e.g. from 21 to 11 ppm $H_2S$ over a 5 day period).

In general, the catalytic activity of the MFC is generated by microbial populations physically associated with the conductive surface of electrodes. A microbial population is "physically associated" with an electrode if at least a portion of the microbial population is growing on the electrode surface as a biofilm.

A "microbe" or "microorganism" can be any microscopic sized organism, including, for example, a bacterium, a fungus, an algae, an archaebacterium, a protist, a plankton and the like. A microbe may be unicellular or multicellular.

Microbes physically associated with the anode enzymatically extract electrons from organic components in the influent and transfer the electrons to the anode electrode. The movement of energy, in the form of electrons, away from the microbes results in accelerated microbial metabolism and increased remediation of influent. The electrons transported to the cathode electrode can be used as a source of energy for a distinct microbial population physically associated with the cathode. Bacterial growth on the cathode can be limited by this energy source being delivered across the circuit.

The electrodes may be charged or primed with a suitable microbial community. A starter community, e.g. a wild-type (parental) community (i.e. naturally present in the influent) or an artificial bank of microbes can be used. A resident community can be obtained by inoculating a reactor with influent to be used and maintained for a period to select and to establish a local community. At the anode, the microbes generate electrons which are transferred to the anode electrode. The cathode can comprise a microbial population where cations, including protons, and electrons are utilized during the reduction of a suitable oxidant. Hence, the cathode can be associated with a microbial population for consuming the cations and/or an abiotic catalyst, such as a metal (e.g., platinum, a tungsten carbide, a cobalt oxide) or a carbon or graphite-based medium to facilitate the removal of protons and other cations from the reactor, preferably as a usable end product such as water. Abiotic catalysts include, for example, coating substrate materials with a thin layer of tungsten-carbide-cobalt, titanium, manganese(IV)-oxide, molybdenum, tungsten, or a combination thereof. Different coating techniques can also facilitate higher catalytic surface area for the abiotic reduction of oxygen.

For example, the anode-associated microbial population may be enriched for microbes that are able to grow in an anaerobic environment, use diverse carbon sources for energy, grow as a biofilm on an electrode and/or transfer electrons to an electrode. The microbial population physically associated with the cathode may be enriched for microbes that have characteristics that improve their ability to function as a cathode-associated microbial population in an MFC. For example, the cathode-associated microbial population may be enriched for microbes able to grow in an aerobic environment, use electrons obtained from the cathode for energy, and/or grow as a biofilm on an electrode.

"Electrodes" refers to conductors through which a current enters or leaves a metallic medium. Electrodes used in an MFC can be comprised of any conductive material that allows microbe attachment. The electrode can be made entirely of material conductive for electrons or can contain material that is conductive for protons. Examples of suitable materials include a metal, a metal compound, a non-metal or a combination thereof. Examples of metals include titanium, platinum and gold; examples of metal compounds include a cobalt oxide, a ruthenium oxide, a tungsten carbide, a tungsten carbide cobalt; a stainless steel; or combinations thereof. Examples of non-metals include a graphite, a graphite-doped ceramic, and a conducting polymer, such as a polyaniline. Electrodes can be a solid, a composite, or a mixture, such as a collection of particulates that are pressed or are formed into a shape of interest, using, for example, a material to help aggregate and secure the particles, such as, an adhesive, a glue, a binder, or a bonder. The particulates can be maintained in a shape or a form of interest by a retaining material (e.g. a restraining means), such as a paper, a membrane, a mesh, a screen, a grating and the like. The retaining material can be comprised of a metal, for example, titanium, and the electrode material can be, for example, graphite granules, large-pore aerogels, graphite fiber brushes, graphite perforated plates, graphite porous spheres, graphite woven fibers, graphite felt, graphite cloth or a combination of different conducting, high surface area particulates. When particulates are used, the particulates can be of any shape and any size, for example, a clinker, a nodule, a fiber or a pellet, which may be regular in shape, such as a sphere, an ellipsoid or a crystal, or irregular in shape, and can be of varying size. Other suitable materials for the retaining material are, for example, a screen or a cloth comprising a metal or a metal composite, such as a stainless steel, a titanium or a high density polyethylene.

The retaining material may provide access to the electrode material to the influent being treated. Hence, voids may be present in the retaining material. If present, voids can be of a size that will not permit passage of the electrode material while at the same time allowing the flow of cations and other materials to and from the electrode or electrode material.

The electrode may be comprised of plural layers of a retaining material, such as a metal mesh filled or interleaved with a conductive material. An electrode may be designed to comprise layers, for example, with plural layers or leafs of retaining material and contained between adjacent layers of retaining means is a layer of conductive material, such as granules, resulting in alternating layers of retaining means and conductive material. Such a configuration enhances electrode size and surface area. Such a configuration also facilitates development of a biochemical gradient within the electrode. The electrode can have a cylindrical shape with, for example, at least two layers, leaves, plies of a retaining material. Individual layers of retaining material can be separated by a fixed distance, such as, for example, about 0.5 cm, about 0.75 cm, about 1 cm, about 1.25 cm. The void between the adjacent layers of retaining material can be filled with an electrode material, such as a conductive material, such as a plurality of granules or porous granules to enhance surface area, which can be, for example, oblong, circular or ellipsoid in shape, with diameters ranging, for example, from about 2 mm along an axis or the longer axis to about 5 mm along the longer axis. The retaining material can be, for example, constructed from a conductive sheet, a film, a grid or a mesh, which can be composed of, for example, a non-conductive plastic, a metal or other conductive material, such as titanium or stainless steel. In a cathode, the layers or multiple layers can enhance proton flow which in turn enhances reducing reactions.

The anode can resemble a packed bed reactor with a structure that is composed of, for example, porous graphite granules, for example, with diameters ranging from about 2 mm to about 5 mm along its longest axis, and structurally retained and shaped using an aggregating means or a securing means, such as a glue, an adhesive, a binder or a bonder, or by a retaining material, such as a grid or a mesh. The retaining material can be made of a non-conductive material such as plastics, or a metal or other conductive material, such as titanium. For example, titanium is conductive, resistant to corrosion, durable and has inherent catalytic properties that complement microbial action. Thus, for example, the retaining material can be a woven titanium material facilitating radial mass transfer of ion exchange between the anode and cathode compartments. A stainless steel or other composite metal mesh can be used for a packed bed-type electrode construction. Tungsten carbide or a cobalt oxide is used as a cost-effective abiotic catalytic means for the anode.

The cathode to anode surface area ratio can be configured to be the same or different. For example, the cathode can be configured to be larger or to have a greater surface area than in the anode. For example, the cathode to anode surface area ratio can be at least about 1:1, about 1.25:1, about 1.5:1, about 1.75:1, about 2:1, about 2.25:1, about 2.5:1, about 2.75:1, about 3:1, about 3.25:1, about 3.5:1, about 3.75:1, about 4:1, about 4.25:1, about 4.5:1, about 4.75:1 or about 5:1.

Electrode size and shape can be determined by operational parameters. For example, an electrode can be sized and shaped to enhance the surface area to volume ratio, for example, by increasing porosity, increasing surface roughness or modifying the topography of the given conductive material. This can be achieved, for example, by applying coatings, defining manufacturing procedures, decreasing particle size and/or adjusting mesh size.

Surface area can in part be dependent on desired residence time, influent waste stream and flow dynamics. For example, particulate electrode materials should not be packed too densely, as that would increase residence time thereby reducing efficiency. Additionally, electrodes should be designed to facilitate good conductivity.

An appropriate void volume (space between contacting conducting particles associated with a packed bed structure or a composite structure of an electrode) can be selected to allow the passage of materials, solid particles and fluid, as well as to decrease the need for electrode replacement/maintenance. If the void volume between conductive particles is great, then the internal resistance of the system increases thereby resulting in a reduction in the redox reactions at the electrodes.

Similarly, an anode can be of a multiple layered configuration, using the materials described herein while maintaining anaerobic conditions. Thus, the anode can comprise alternating layers of a retaining material, such as those described above, and of a conducting material, with the innermost and outermost layers comprising the retaining material.

The configuration of the electrodes is a design choice to optimize reaction conditions. The MFC can comprise alternating plates, sheets and/or leaves of electrodes; a single anode and a single cathode, each of which can be of any shape, for example, a rod, a column, a cylinder, a bar and/or a sheet; an equal number of a plurality of anodes and a plurality of cathodes; an unequal number of a or a plurality of anodes and a or a plurality of cathodes; a central anode with the cathode comprising the inside sidewall of the reactor or affixed as a layer running parallel to the inside sidewall (a "perimeter" electrode); a central cathode with the anode comprising the sidewall of the reactor or affixed as a layer running parallel to the sidewall; plural central anodes with a perimeter cathode; or plural central cathodes with a perimeter anode. The electrodes can be oriented in any direction, such as, for example, horizontally, vertically or radially. As used herein, an anode, unless the context so dictates, can represent a single anode or plural anodes and a cathode can represent a single cathode or plural cathodes.

Spacing between the anode and cathode is selected to optimize operational parameters, such as, for example, proton transfer. Any leakage of oxygen to the anode could disrupt electron transfer in the anode or anode compartment; increase biomass growth at the anode; decrease electricity production; and/or decrease energy recovery. Thus, the spacing can be optimized to minimize oxygen transfer while maintaining proton transfer.

The spacing can be such that, for example, the anode and cathode are ionically in contact but the electrical connection is eliminated. Such a configuration prevents a short circuit and optimizes ion (e.g., proton) conductivity such that mass transport does not become rate-limiting. By optimizing the spacing between the anode and cathode, current flow can be optimized, resulting in enhanced oxidation and reduction rates. Features that optimize cation transfer include the minimum distance between the cathode and anode electrodes, solution conductivity and concentration gradients. Solution conductivity (ionic conductivity) and concentration gradients (pH and/or gas phases) also impact the movement of protons from the anode to the cathode. If the anode environment is proton-rich and the cathode environment is proton-poor, protons will migrate from the anode to the cathode until equilibrium is achieved. The shorter the distance protons have to travel, the faster the reduction reaction can occur. The anode can be anaerobic (with few to no oxidants) and the cathode aerobic (with energy-rich oxidants). Under such conditions protons will migrate along the gradient to complete the reduction reaction. The distance between the anode and the cathode can be, for example, less than 3 cm, less than 2.75 cm, less than 2.5 cm, less than 2.25 cm, less than 2 cm, less than 1.75 cm, less than 1.5 cm, less than 1.25 cm, or less than 1 cm.

A barrier between electrodes may be used (e.g. a separating means). This barrier can be made of any non-conducting material, such as, for example, a plastic, a ceramic and/or a polymer (e.g. nylon), and can be presented as, for example, a sheet, cloth and/or a mesh to provide a barrier means between the electrodes or electrode compartment. This barrier can permit the passage of fluid and/or microbes. Such a barrier is not considered to be a proton selective material. Such barriers may maximize proton transfer and/or decrease crossover influent, oxidant and/or other reactants. The separating means may be a porous sheet or mesh that is permeable to microbes and fluids. However, in some embodiments, a proton selective material, such as cation exchange membranes can be used, but are expensive.

In some embodiments, the barrier between electrodes comprises a porous, insulating material that prevents short circuiting of the MFC while permitting proton, microbe and/or fluid transfer. For example, a microporous mesh having, e.g., a pore diameter of between 0.2 and 40 µm can be used. In some embodiments the pore diameter is no more than about 30 µm. Such a microporous mesh can be made of any insulating material, such as nylon, PTFE or PVDF. In some embodiments, the insulating barrier is hydrophilic.

A physical barrier may not be necessary when the distance between the anode and cathode is minimized and controlled to avoid short-circuiting as described herein.

In certain embodiments, the MFCs described herein can establish biological gradients (from anaerobic to aerobic metabolism), which can exploit a greater metabolic and respiratory diversity than is available in systems that either have a large separation between the electrodes, e.g. greater than 3 cm), or that employ a cation exchange membrane to minimize oxygen crossover from the cathode to the anode.

Such biologic and chemical gradients occur as a result of biological and system operational parameters and enhance MFC efficiency by providing suitable microenvironments. Hence, the mixture of different microbial consortia maximizes efficiency and energy recovery. The consortia are enriched when conditions are maintained in the reactor and portions thereof, such as, anaerobic conditions at the center of the anode or in the anode compartment, aerobic conditions in the void or space between the anode and cathode, and variable aerobic conditions among the layers of the cathode. Similar conditions can be obtained by having different oxidant concentrations, e.g., nitrate, in the cathode compartment. A carbon gradient may exist in the MFC, both from the top of the reactor to the bottom, and radially outward from a central anode to the peripheral cathode in such an electrode configuration.

In certain embodiments, the microbial populations are enriched from a parental microbial population indigenous to the wastewater to be purified. In such embodiments, the wastewater to be purified is contacted with the anode electrode of an MFC. During reactor enrichment, the MFC is first operated across a high resistance (e.g., 1000-5000Ω) to achieve biomass at the anode electrode surface. After stable current production has been achieved over several flow cycles (or batch cycles), the resistance across the circuit is then lowered to a medium resistance (e.g., 100-500Ω) to begin optimizing metabolism. Current reproducibility should be achieved again and the resistance will be finally lowered to a low resistance (e.g., 10-50Ω) to allow for maximum biofilm activity for the degradation of compounds. This enrichment process can take anywhere from 10 to 30 days depending the nature of the wastewater and MFC operational parameters. After biofilm activity is stabilized, the reactor may be operated for maximum organic degradation rates (close to short-circuit) or maximum power (defined by the cell polarization measurements).

During operation of the MFC, the fluids at or near the anode can be gently agitated, for example, by operating the MFC under flow conditions, to prevent settling and septic conditions, while maintaining anaerobic conditions. The fluid at or near the cathode can be agitated, for example, by added oxidant. The water treatment process can be continuous, with a constant flow of influent through the anode compartment and a constant flow of product, for example, water across or from the cathode. The inflow of influent can be configured, for example, to allow an average fluid retention time of, for example about 1 day, about 2 days, about 3 days, about 4 days, about 5 days, about 6 days or about 7 days at the anode for treatment to potable or near potable levels. Longer residence times can be used to attain water approaching drinkability. However, increasing the electrode active surface area per unit volume of the reactor can enhance oxidation rates and thus, decrease residence time. Operating the reactor at or near closed circuit conditions can also decrease residence time and accelerate oxidation reactions.

Nutrient degradation rates can be monitored and optimized. For example, samples from the reactor can be collected for chemical and biological analysis of the influent and effluent. The level of acceptable organic matter, particulates and other elements in an effluent from the MFC is a design choice. For example, if the amounts tolerated are exceeded after a single pass through a reactor then the effluent can be retained for a longer time in the reactor or recycled through the same reactor or passed through another reactor. The recycling system can include an effluent communication means that transports the effluent back to the input means of the MFC containing means for treatment once again in the same MFC or the effluent can be transported by a communication means to a second MFC. The number of passes through an MFC to achieve a desired endpoint is a design choice.

Production and reaction parameters can be monitored and recorded periodically or continuously during reactor operation, for example, using automated digital devices (for example, a high-impedance digital multi-meter). Additional electrochemical evaluations, including potentiodynamic polarization and cell polarization, can be conducted to identify any rate limiting reactions that may take place at the anode or cathode. Any rate limiting reactions further are evaluated to determine whether a consequence of system operation, biological limitation, and/or secondary chemical reactions. System modifications might be employed, based on these data, to address the impact a rate limiting reaction or factor might have on overall reactor efficiency, e.g., bioaugementation of the active biofilms, and/or changing system flow rates, can be made.

The systems described herein may be optimized to favor one or more of a variety of competing biological processes, that is, to maximize for power production, particular fermentative reactions, methanogenesis, microbial biomass accumulation (i.e., biofouling), and/or mass transfers.

For example, to decrease methanogenesis and biofouling, it may be beneficial to run the MFC with a very small load, i.e., facilitate maximum current by applying a small resistance across the circuit, for example, 200Ω or less. However, operating an MFC system at maximum current does not allow for maximum power generation because the operating cell voltage can be low. Operating the system at maximum power during sludge reduction can result in faster accumulation of secondary biomass and an increase in methane production because electrons are allowed to accumulate within the microbial consortia and can be used for growth or for the reduction of carbon dioxide. Furthermore, longer residence times can be required during maximum power generation because energy recovery happens more efficiently after the fermentation process has already taken place. This could be alleviated by designing an in-line containing means to allow fermentation of the influent prior to treatment in an MFC.

Alternatively, methane production can be minimized by selecting organisms that favor an accelerated electrogenic metabolism over carbon dioxide reduction (Ishii et al., Biosci. Biotech. Biochem. 72, 286, 2008). Also, microbes can be selected for which operate at lower temperatures, therefore requiring less energy for reactor heating.

The real time monitoring of the MFC offers the flexibility of operating to obtain, for example, maximum power, to recover energy directly as electricity. Hence, when energy demands are high or desired, for example, during the day, the system can operate with a higher load, therefore slowing the influent degrading process, but enhancing energy recovery and electricity production. Alternatively, the MFC can be operated with a small load, for example, at night, to accelerate influent degradation and reduce biomass production.

In certain embodiments, the anode of the MFC described herein is physically associated with a diverse population of microbes that are not limited to using only a single carbon source for energy. Thus, it is possible to obtain a comprehensive phylogenetic description of the biofilm community residing at the electrodes. Such an analysis enables production of and identity of populations optimized for use in an anode or interest or a cathode of interest to obtain a desired purpose, such as energy generation, or residence time to achieve a certain milestone of a parameter, that is, the consortia is characterized and quantified to maximize obtaining a product of interest. That consortia is optimized for that application or use.

Metagenomic techniques produce genomic data that reflect the entire collection of genes present in a community, which then can be used to identify specific gene clusters, or organisms, that are involved with metabolic processes relevant to, for example, sludge oxidation, energy recovery and water production.

Phylogenetic profiling is used to analyze patterns of present and absent genes families, or proteins, in different genomes that subsequently are compared to the distribution of phenotypic characters of interest. Genes (or combinations of genes) found preferentially in the genomes of organisms sharing a particular phenotype are considered functional candidates. The phylogenetic profiling can be conducted, for example, using the Automated Phylogenetic Inference System (APIS), developed at the J. Craig Venter Institute, see, for example, Badger et al., Int. J. Syst. Evol. Microbiol. 55, 1021, 2005; Federova et al., Genomics 6, 177, 2005; and Palenik et al., PNAS 103, 13555, 2006.

The information then is applied to elucidate specific functional processes that occur in a diverse microbial community and can be expanded by conducting metagenomic and metatranscriptomic sequencing under a variety of conditions to monitor the phylogenetic and gene expression dynamics within a given system. Understanding microbial community dynamics is a component for developing an optimized renewable energy and/or water treatment system that can demonstrate stable and continuous operation under a variety of conditions with a varying influent and in a number of environments outside of controlled laboratory conditions, such as in industrial, agricultural or municipal applications.

To assess the microbial populations, samples of the anode and cathode biofilms, along with system influent and effluent, are processed, for example, by genomic analysis, for example, 454 DNA sequencing and metagenomic analysis. The commercial availability of 454 and Solexa sequencing technologies provides an alternative to Sanger sequencing for large scale DNA sequencing projects. The 454 technology is based on pyrosequencing (Nordstrom et al., Biotech. Appl. Biochem. 31, 107, 2000; and Gharizadeh et al., Anal. Biochem. 301, 82, 2002). Known advantages of 454 and Solexa sequencing include: 1) the ability to construct a genomic library without the need to clone cDNA into a vector; 2) the vectorless library allows the circumvention of traditional cloning approaches and their associated issues such as representation biases and clonability/stability of certain cDNA fragments; and 3) the ability to quickly produce large amounts of sequence data (~400 Mb to 1 Gb in one run), and coverage, relative to present technologies.

The MFC can include a containing means. Such a containing means can, for example, house the entire MFC, house a component of the MFC or a plurality of MFCs. Generally, the containing means can have any shape, including a cylinder, an antiprism, a bifrusta, a cube, a frusta, a prism, a cuboid, a square prism, a panel, or combination thereof. The overall shape is a design choice. Factors that contribute to choice of the shape of an MFC described herein include, for example stackability, ability to be organized economically in a space and maximizing efficiency of fuel cell operation.

The containing means can be made of any material that can withstand the pressure and the weight of the influent volume and other materials contained in the MFC. In some embodiments, the containing means is inert to microbial action and/or to components found in the influent. Examples of suitable materials include a metal, such as a stainless steel, an aluminum, an anodized aluminum, a titanium and an anodized titanium; a plastic, such as a polypropylene, a polystyrene, a polyacrylamide or a polymethacrylate; a glass; a cellulosic product, generally which may include a water-proof or a water-resistant layer or lining; a ceramic; or combinations thereof.

The size of the containing means can be varied based on, for example, the intended use of the MFC. Thus, for example, reactor size can be scaled for specific applications. For example, a reactor facilitating a working volume (the maximum volume of fluid in a reactor at a particular time point) of about 100 to about 500 gallons of influent may serve the needs of a single family home. A reactor with a working volume of about 1000 to about 9000 gallons of influent may facilitate the treatment needs of a small business or of an animal production facility. Larger volume reactors (thousands to millions of gallons of influent) may be used for municipal water treatment facilities servicing communities. Such volumes can be accommodated by the aggregate volume of a plurality of MFC modules working in concert.

Electric power produced by a MFC described herein may be obtained by an electrode communicating means, such as a wire or post, which may be composed of a conductive metal, and may be used to charge batteries or for other uses, for example, in off-grid environments. Hence, the power generated by a fuel cell of interest can be used to operate various energy requiring means associated with a fuel cell or a modular system of interest, such as, driving a pumping means for moving influent or other material into a fuel cell of interest.

The containing means can include means to access the interior thereof, such as, for example, a port, a lid, a door, a cover, a bottom or a window. The number of and location of said access means on the containing means are design choices. For example, certain sites on a sidewall of the containing means can be used to ensure access to the interior of the containing means. The access means can include means to ensure a liquid or a gas will not be lost from a reactor or introduced into a reactor by way of the access means, such as, for example, a washer or a gasket, which can be made of a suitable material, such as a rubber or a plastic. Each of those access means can comprise means to reversibly secure said means to or on the containing means. Suitable such securing means include, for example, a screw, a bracket or a clamp The access means can also comprise, for example, a valve, a switch or other manipulable means to control access to the interior of a reactor. Examples of access means include, for example, influent access means, waste gas effluent means, waste inflow means, product outflow means, electricity conducting means, circuit connecting means, liquid inflow means, liquid outflow means, influent monitoring means, influent entry means, gas monitoring means, water effluent means, effluent access means, oxidant influent means, oxygen or air influent means and energy conducting means. The various means can be comprised of material identical to, similar to, or compatible with the material comprising the reactor and/or containing means.

In certain embodiments the containing means can house, for example, a unit, a module or a cell of a modular system or apparatus in which a plurality of MFC modules are operated in series or in parallel as a single system or apparatus. The size of an individual module in the apparatus can be dictated by, for example, its intended use. The various modules of an apparatus can be of the same size or have differing sizes. The modules can be amassed and connected by a communicating means and/or can be collected in a collective containing means. The communicating means can be, for example, a fluid conducting means, such as a tube, a tubing, a pipe, a piping, a hose, or a conduit. Said fluid conducting means can be of any suitable material, such as, for example, a metal, a rubber, a plastic, a glass, or a combination thereof.

The containing means also can be equipped with suitable controls for monitoring and/or providing information of environmental conditions of reactor contents, for example, to ensure conditions are conducive to microbial growth and/or metabolism. For example, one of said access means can provide access to the culture medium, that is, the water-based influent that is being acted on by the microbes, for example, to determine temperature by way of a temperature sensing means, such as a thermometer or a thermocouple, for example. The temperature sensing means can be housed with means to ensure a liquid-proof seal is present at the access means, such as a washer or a gasket. The temperature means can comprise a regulating means that enables control of means to alter a reactor environment parameter, such as, temperature, wherein the regulating means interacts and/or interfaces with a means of adjusting the parameter, such as a heating means, a cooling means or both, associated with the reactor, such as, a microprocessor means, a computer processing means or a data processing means associated with a temperature controlling or regulating means to bring the influent being treated to the desired temperature. Such regulating of temperature can maintain a homeostatic environment in the reactor or can provide a suitable varied and/or timed schedule of temperature changes over a period of time.

Other controls for monitoring environmental, culture or incubation conditions can be used, such as sensors for oxygen content, for pH, for pressure, for measuring any other reactant or product of interest. For example, because operation of the anode can be enhanced under anaerobic conditions, an oxygen sensing means can be provided at the anode compartment to ensure low levels of oxygen are maintained therein. Another access means at the anode compartment can include a means for removing gases, such as a vacuum means, or a gas inflow means, for example, to introduce an inert gas, such as nitrogen, into an anode compartment of a reactor of interest to produce or to maintain an anaerobic atmosphere or environment. At the cathode compartment, oxygen or other oxidant, such as, a nitrate, a sulfate, a fumarate and/or a heavy metal may facilitate the reducing actions that occur therein and thereon, for example, to produce water. Hence, an oxidant or oxygen sensing means also may be provided at the cathode compartment. Additionally, the cathode compartment can have an access means equipped with a means to introduce oxidant or oxygen to the cathode compartment.

The invention now will be exemplified in the following non-limiting examples.

EXAMPLE

Example 1

Exemplary Modular Water Treatment System

A 20 gallon capacity microbial fuel cell reactor was constructed of four independent MFC columns operated in series. Each column was constructed with an internal anode wrapped externally in a thin insulating layer of nylon. The nylon mesh (28 μm pore size) served as an insulating barrier to prevent electrical contact between the anode and the cathode, but still facilitated ion transport between the compartments. The anode was column-shaped and contained carbon-granules held in place by a titanium mesh. The cathode consisted of two cylinders wrapped around the anode with a distance of about 1 cm separating the anode and the closest cathode cylinder. Both the anode and the cathode were of a packed-bed configuration. Titanium mesh was used for the anode and cathode cylinder frames and acted as the conductive leads for each compartment. The anode and cathode were each filled with asymmetric synthetic graphite granules (~¼ inch maximum diameter) to increase active surface area. Each internal anode compartment had a total volume of 2.8 L.

Influent entered the anode through an inflow means located at the top of the column, and exited the anode through an outflow means located at the bottom of the column.

The system was operated at ambient temperatures. Throughout data collection, the reactor was kept under constant flow at a rate of 100 mL/min with a sample residence time of 6.5 min per cycle in the reactor. The anode and cathode were connected across a 1050 ohm resistor throughout closed circuit operation.

Tests were also performed in batch (no flow) to observe if any differences in water quality and energy recovery were apparent relative to flow operation.

Each raw sludge sample was analyzed prior to introduction into the system. Treated effluent was analyzed at 15 and 5 days of operation. Tables 1-3 show water quality results (before and after treatment) as analyzed by EPA standard methods at CRG Marine Laboratories, Inc. Table 1 provides the results of a water quality analysis for sludge influent and treated effluent after 15 days of operation. BOD=biological oxygen demand. Table 2 provides the results of a water quality analysis for the water surrounding the cathode after 15 days of operation. The system was submerged in oxygenated water during operation. Samples of the cathode effluent were periodically analyzed to ensure that the cathode water was not being contaminated during operation. Table 3 provides the results of a water quality analysis for a sludge influent and treated effluent after 5 days of operation.

TABLE 1

|  | Raw Sludge Sample (1) | MFC Treated Effluent (15 days) | % Change |
| --- | --- | --- | --- |
| BOD (mg/L) | 1540 | 5.77 | 99.6% |
| Volatile Suspended Solids (mg/L) | 2780 | 1.5 | 99.9% |
| Total Suspended Solids (mg/L) | 3120 | 1.25 | 100.0% |
| Turbidity (NTU) | 1300 | 2.94 | 99.8% |
| Total Phosphorous (mg/L) | 64.7 | 4.7 | 92.7% |
| Total Nitrogen (mg/L) | 9.18 | 3.38 | 63.2% |
| Ammonia-N (mg/L) | 11.9 | 0.057 | 99.5% |
| Sulfate (mg/L) | 78.1 | 175 | 55.4% |

TABLE 2

|  | Cathode Effluent (Initial) | Cathode Effluent (Final, 15 days) | % Change |
| --- | --- | --- | --- |
| BOD (mg/L) | ND (<2.00) | ND (<2.00) | 0.0% |
| Volatile Suspended Solids (mg/L) | 2 | 2 | 0.0% |
| Total Suspended Solids (mg/L) | 3 | 3 | 0.0% |
| Turbidity (NTU) | 26.3 | 3.45 | 86.9% |
| Total Phosphorous (mg/L) | NR | 5.48 | — |
| Total Nitrogen (mg/L) | NR | 3.3 | — |
| Ammonia-N (mg/L) | 1.03 | ND (<0.03) | 100.0% |
| Sulfate (mg/L) | 159 | 170 | 6.5% |

TABLE 3

|  | Raw Sludge Sample (2) | MFC Treated Effluent (5 days) | % Change |
| --- | --- | --- | --- |
| BOD (mg/L) | 4700 | 21.7 | 99.5% |
| Volatile Suspended Solids (mg/L) | 22500 | 4.25 | 100.0% |
| Total Suspended Solids (mg/L) | 25100 | 9.25 | 100.0% |
| Turbidity (NTU) | 9690 | 48.2 | 99.5% |
| Total Phosphorous (mg/L) | 239 | 129 | 46.0% |
| Total Nitrogen (mg/L) | 892 | 1.8 | 99.8% |
| Ammonia-N (mg/L) | 51 | 1 | 98.0% |
| Sulfate (mg/L) | 27.1 | 144 | 81.2% |

Figure 2:
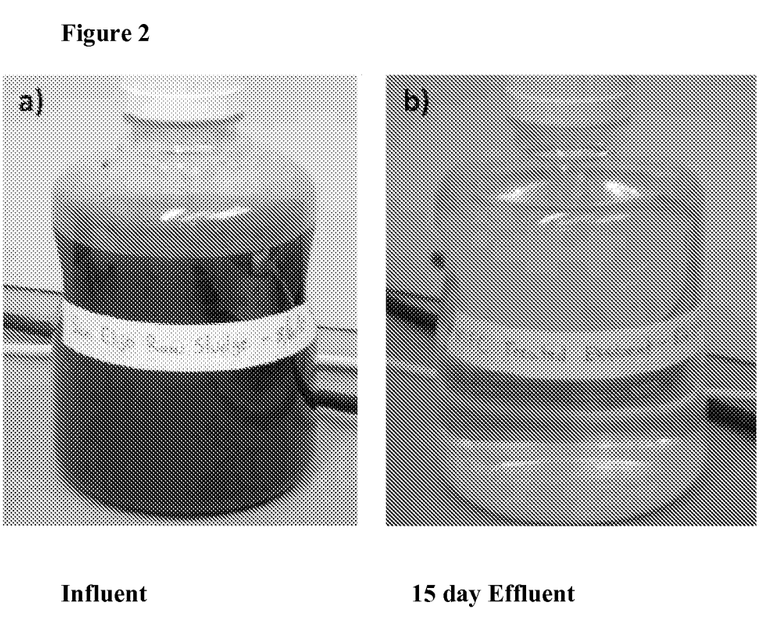
FIG. 2 is a photograph of a) an initial sludge sample with water quality values as listed in Table 1, first column; and b) treated effluent with water quality values listing in Table 1, second column.

When the system was operated under flow, energy recovery in the form of power density was 0.5 W/m$^3$ (reactor volume). However, when the system was operated in batch with an influent residence time of approximately 24 hours, the power density. These data indicate that a majority of sludge degradation occurs during the first two days of operation, while maximum energy recovery begins roughly 5-10 days after sludge introduction. As seen in FIG. 2, the improved water purity was also readily apparent via visual inspection.

When the system was operated under flow, energy recovery in the form of power density was 0.5 W/m³ (reactor volume). However, when the system was operated in batch with an influent residence time of approximately 24 hours, the power density nearly tripled to 1.5 W/m³ (reactor volume). These data indicate that system operation can be optimized for different demands. For example, when power demands are higher the system can be operated in batch to generate more electricity and when demands are low the system can be operated under flow to improve water quality and accelerate treatment. System performance can similarly be varied by applying different loads across the circuit allowing more or less electrical current flow.

Figure 3:
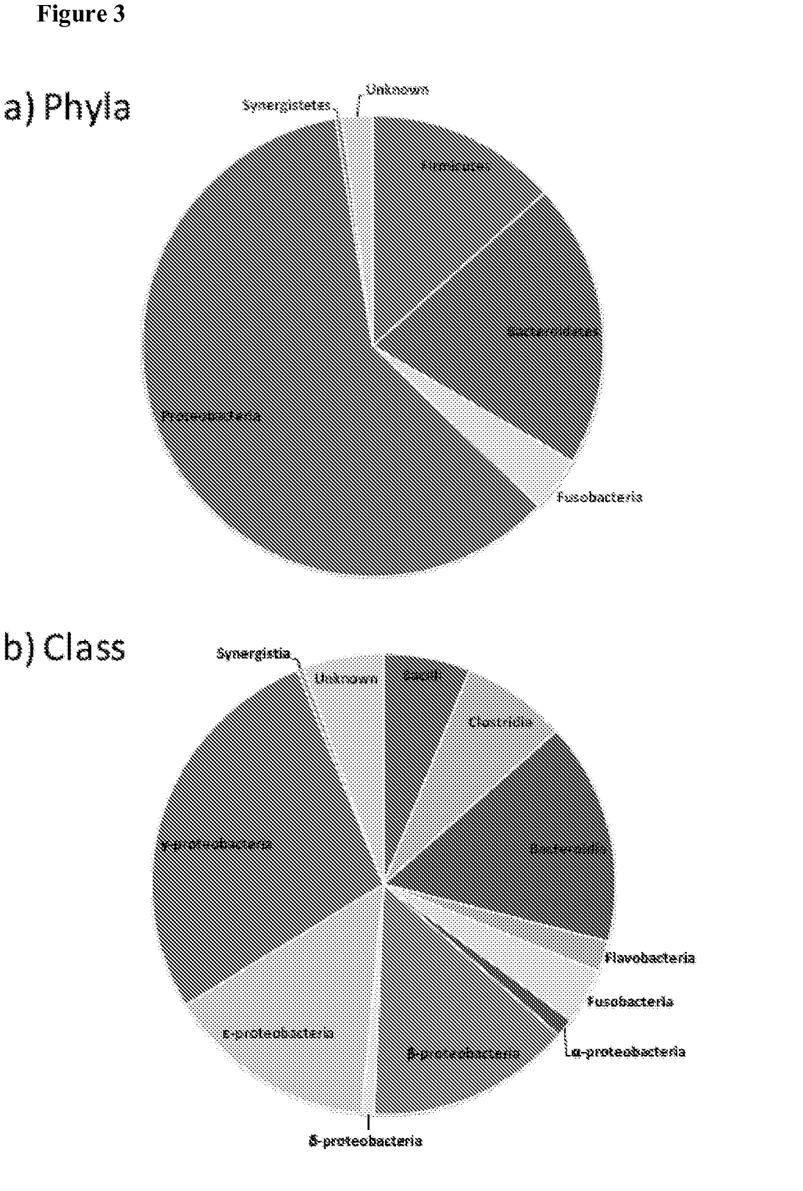
FIG. 3 shows the phylogentic diversity of raw sludge samples based on 16s rRNA sequencing with Sanger technology. 200 clones were selected for sequencing. The results show a) dominant bacterial phyla; b) dominant bacterial classes; and c) dominant genera of bacteria in the raw sample.
Figure 4:
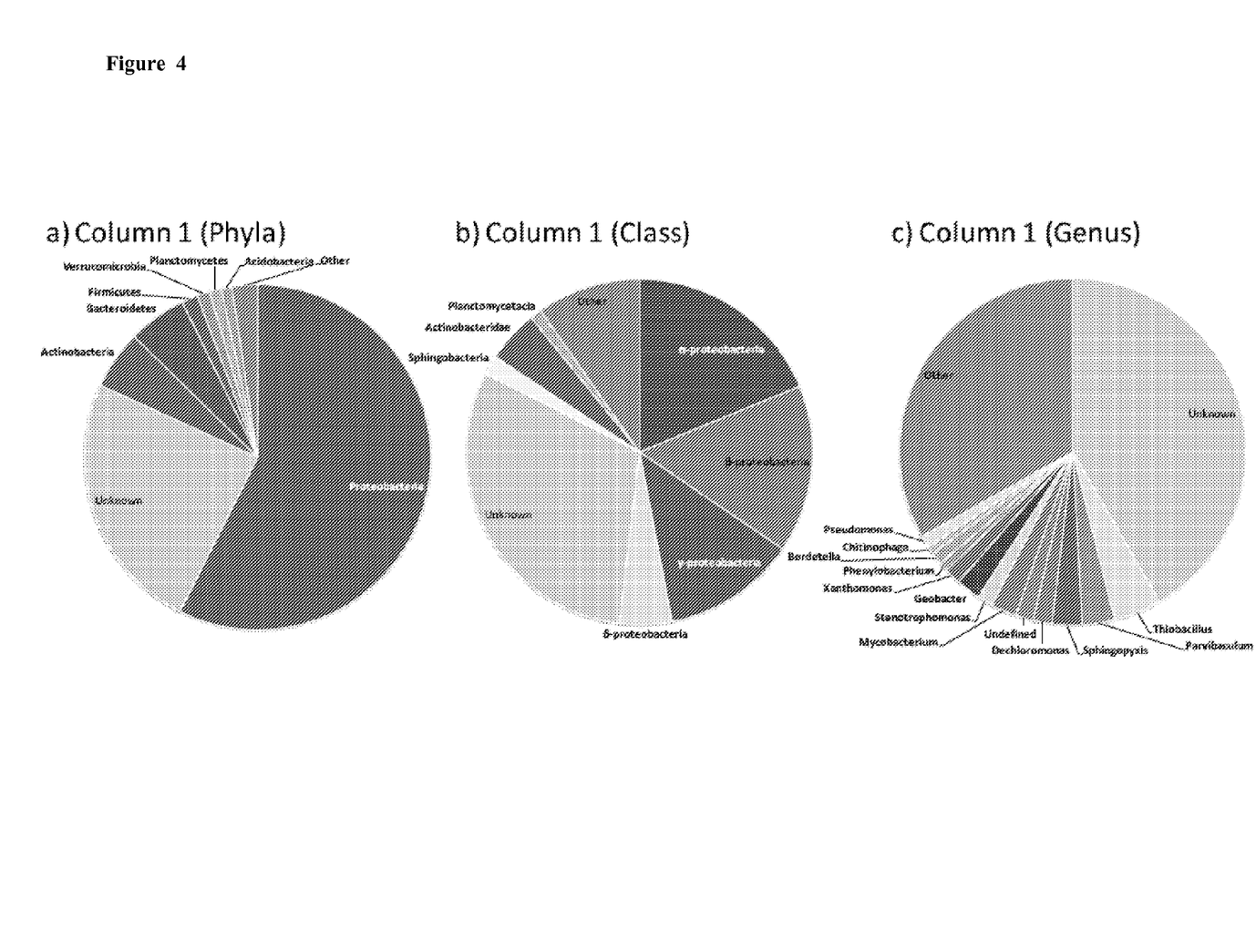
FIG. 4 shows the phylogentic diversity of anode graphite granule-associated biomass for MFC column 1 a) phyla, b) class, and c) genera; and phylogenetic diversity of anode graphite granule-associated biomass for MFC column 3 a) phyla, b) class, and c) genera. DNA was extracted from anode-associated materials and sequenced using non-primer specific 454 sequencing technology. The term "Other" refers to bacteria phyla, class, and/or genera that only represent ≤0.1% of population abundance. The term "Unknown" refers to ambiguous or overlapping protein matches using APIS analysis software.

Phylogenic analysis of the electrode-associated microbial populations was performed as described herein. The phylogentic analysis of the initial sludge sample (FIG. 3) and electrode adhered biomass from columns 1 and 3 (FIG. 4) show a significant difference in dominant populations between the columns and initial sample, indicating that microbial selection occurs through MFC operation and serves to decrease the abundance of pathogenic populations such as *Neisseria*, *Enterobacter*, and *Dysgonomonas*.

All references cited herein are herein incorporated by reference in entirety.

We claim:

1. A modular water treatment system comprising a plurality of microbial fuel cells (MFCs), wherein each of the plurality of MFCs comprises an anode connected to a cathode by a conductive material, and wherein:
    the anode is physically associated with a first microbial population; and
    the cathode is physically associated with a second microbial population, the electrons transported to the cathode electrode are used as a source of energy for a distinct microbial population physically associated with the cathode, wherein at least a portion of the second microbial population is growing on the cathode surface,
    the distance between the anode and cathode is less than 3 cm,
    there is no proton selective material between the anode and the cathode, and
    the surface area of the cathode is at least twice the surface area of the anode.

2. The water treatment system of claim 1, which further comprises a porous insulating material between the anode and cathode.

3. The water treatment system of claim 2, wherein the porous insulating material has a pore diameter of no more than about 30 μm.

4. The water treatment system of claim 1, wherein the first microbial population is enriched for microbes able to grow in an anaerobic environment using diverse carbon sources for energy.

5. The water treatment system of claim 4, wherein the second microbial population is enriched for microbes able to grow in an aerobic environment using electrons from the cathode for energy.

6. The water treatment system of claim 5, wherein the first microbial population and the second microbial population are from the same parental microbial population.

7. The water treatment system of claim 6, wherein the parental microbial population is a microbial population naturally occurring in sewage wastewater or sludge.

8. The water treatment system of claim 1, wherein the anode is positioned internal to the cathode.

9. The water treatment system of claim 1, wherein the anode and the cathode are separated by no more than 2 cm.

10. The water treatment system of claim 1, wherein the anode comprises a plurality of conductive particles held in place by a retaining material.

11. The water treatment system of claim 10, wherein the plurality of conductive particles comprise graphite granules, graphite felt, graphite cloth, graphite brushes or combinations thereof.

12. The water treatment system of claim 10, wherein the retaining material comprises a titanium mesh, a stainless steel mesh, a plastic mesh or a combination thereof.

13. The water treatment system of claim 10, wherein the cathode also comprises a plurality of conductive particles held in place by a retaining material.

14. The water treatment system of claim 1, wherein the cathode or anode is a cylinder or column.

15. The water treatment system of claim 8, further comprising a liquid inflow means positioned at a first end of the anode and a liquid outflow means positioned at a second end of the anode.

16. The water treatment system of claim 1, wherein at least a subset of the MFCs operate in series.

17. The water treatment system of claim 1, wherein at least a subset of the MFCs operate in parallel.

* * * * *